US012775314B2

(12) United States Patent
Lin et al.

(10) Patent No.: US 12,775,314 B2
(45) Date of Patent: Oct. 27, 2026

(54) ELECTRONIC CARD RETAINING DEVICE

(71) Applicant: FOSITEK CORPORATION, New Taipei City (TW)

(72) Inventors: Chun Han Lin, New Taipei City (TW); Che Wei Chang, New Taipei City (TW); Yu-Hsun Lee, New Taipei City (TW)

(73) Assignee: FOSITEK CORPORATION, New Taipei City (TW)

(*) Notice: Subject to any disclaimer, the term of this patent is extended or adjusted under 35 U.S.C. 154(b) by 158 days.

(21) Appl. No.: 18/659,214

(22) Filed: May 9, 2024

(65) Prior Publication Data

US 2025/0286318 A1 Sep. 11, 2025

(30) Foreign Application Priority Data

Mar. 5, 2024 (TW) ................................ 113107965

(51) Int. Cl.
*G06F 1/185* (2026.01)

(52) U.S. Cl.
CPC .................................... *G06F 1/185* (2013.01)

(58) Field of Classification Search
CPC ................................ G06F 1/185; H05K 1/144
See application file for complete search history.

(56) References Cited

U.S. PATENT DOCUMENTS 6,319,027 B1 * 11/2001 Pickles .............. H01R 12/7005
439/157

* cited by examiner

*Primary Examiner* — James Wu
(74) *Attorney, Agent, or Firm* — Rosenberg, Klein & Lee

(57) ABSTRACT

An electronic card retaining device includes a seat mounted on a motherboard and having stopper sections; and a movable retaining member pivotally connected to the seat and having a retaining end facing toward a position to where an electronic card is to be fixed, and an operating end provided with guide sections, which can pass the stopper sections to move between a retaining and a releasing position when the movable retaining member rotates pivotally. The electronic card has an end electrically connected to the motherboard and another end for engaging with the retaining end of the movable retaining member. To retain the electronic card, simply push the engaging end thereof downward and the guide sections will move to the retaining position. To release the electronic card, simply sidewardly deform the elastic arm for the guide sections to move from the retaining position to the releasing position.

19 Claims, 5 Drawing Sheets

ELECTRONIC CARD RETAINING DEVICE

FIELD OF THE INVENTION

The present invention relates to an electronic card retaining device, and more particularly, to a structurally simplified, quick assembling, and easily operable device for retaining an electronic card (such as a solid state drive) in place on a motherboard.

BACKGROUND OF THE INVENTION

The conventional solid state drive (SSD) uses mSATA standard, which has limited overall capacity because the number of flash memories that can be provided on the printed circuit board (PCB) is limited. Therefore, a more recent standard named Next Generation Form Factor (NGFF) or M.2 is developed for using with solid state drive. Since M.2 standard allows flash memory chips to be provided on both sides of the circuit board, it has advantages like smaller volume, higher capacity, and lower manufacturing cost, compared to the conventional mSATA standard.

General solid state drive with M.2 standard has various length specifications available for choosing, and the motherboard for a computer may also be designed to allow for solid state drive of different length specifications. In response to the need of holding solid state drives of different length specifications in place, in most cases, the solid state drives with M.2 standard are fastened to the computer motherboard by screws and bolts. However, the use of screws and bolts as fastening means will cause a lot of inconveniences in assembling and disassembling the solid state drives to and from the motherboard. Further, bolts must be embedded in the computer motherboard for the screws to fasten thereto. This would inevitably result in increased manufacturing cost.

Taiwan Patent Pub. No. 1568334 discloses an assembling fastener structure, which includes a loading section, a pivotally connecting section, a protruding section, and a retaining and pressing section. The loading section includes a loading surface and a back surface opposing to the loading surface. The pivotally connecting section and the protruding section are projected from the back surface and the loading surface of the loading section, respectively, to extend along an axial direction of the pivotally connecting section. The retaining and pressing section is radially protruded from one side of the protruding section to extend along a radial direction of the pivotally connecting section, so that the retaining and pressing section and the loading section together form a retaining groove between them, and a release opening not covered by the retaining and pressing section is formed at a diametrically opposite side of the retaining groove.

To use the above assembling fastener structure, the pivotally connecting section can be correspondingly inserted into one of many mounting holes provided on a computer motherboard depending on the actual specification and size of the solid state drive. Then, a tool such as a slotted screwdriver is extended into an operating slot pre-formed on the protruding section to turn the protruding section of the assembling fastener structure until one of the opposing retaining groove and release opening is oriented to the solid state drive, so as to set the assembling fastener structure to a locking or a releasing state. When using the above assembling fastener structure, a specific tool, i.e. the slotted screwdriver, is necessitated to operate the assembling fastener structure. Meanwhile, it is labor-consuming to turn the protruding section, so that the assembling fastener structure is not convenient for use.

Further, China Patent Pub. No. CN 109659727A discloses a fastening device assembly, which includes a main body mounted to a circuit board and internally receiving at least one retaining member, which is provided on one lateral side with a lodging section. The main body is internally provided with an elastic plate or an elastic member for pressing against the retaining member, so that the retaining member is flexibly stretchable and skewable.

In practical application of the above conventional fastening device assembly, an electronic card (such as a solid state drive) may have its one edge directly pressed downward from a top of the retaining member, so that the retaining member is elastically compressed and skewed while the lodging section is retained to the outer side of the notch provided on the edge of the electronic card (i.e. the solid state drive), so that the electronic card can be easily located in place with simple operation. However, the above fastening device assembly has relatively complicated structure and can not be easily assembled. Therefore, it is not economically suitable for use with components of low unit cost.

China Utility Model Patent Pub. No. 214409847U discloses a retaining device for quick installing and releasing of an M.2 card. The retaining device includes a stationary seat and a sliding block. The stationary seat is provided on two sidewalls with a slant sliding slot each; and the sliding block is provided at two lateral sides with an outward extended guiding bar each. The guiding bars extend into the sliding slots to guide the sliding block to slide along the sliding slots. A spring is disposed between the stationary seat and the sliding block. When the sliding block is subjected to a force for the guiding bars to slide in the sliding slots and bring the sliding block to a position above the stationary seats, the sliding block can move sideward and upward at the same time to provide a space for an M.2 card to insert into downwardly. When the force is released from the sliding block, the spring exerts an elastic force that brings the sliding block to its original or retaining position to retain the M.2 card in place.

When using the above-structured M.2 card retaining device, the spring is required for driving the sliding block to return to its original position. Therefore, the M.2 card retaining device disclosed in China Utility Model Patent Pub. No. 214409847U includes a lot of parts and involves complicated assembling procedures to inevitably increase the cost of the retaining device. Further, when using the above M.2 card retaining device, a horizontal force exerted by the sliding slots to drive the sliding block to move sideward would produce a vertical component necessary for moving the sliding block upward or downward. In this case, the guiding bars and the sliding slots would heavily rub with each other to therefore increase the driving force applying to the sliding block when operating the M.2 card retaining device.

In view that the conventional electronic card (e.g. a solid state drive) retaining device has the above disadvantages in practical application thereof, it is tried by the inventor to develop an improved electronic card retaining device to overcome the above disadvantages.

SUMMARY OF THE INVENTION

A primary object of the present invention is to provide an electronic card retaining device, which includes a seat mounted on a motherboard and having stopper sections; and a movable retaining member pivotally connected to the seat and having a retaining end facing toward to a position where an electronic card is to be fixed and an operating end provided with at least one elastic arm. The elastic arm is provided with a guide section, which is movable when the movable retaining member rotates pivotally to thereby press and deform the elastic arm while passes the stopper sections into a retaining position or a releasing position. The electronic card has an end electrically connected to a terminal block on the motherboard and another end for engaging with the retaining end to tip up the operating end of the movable retaining member while the guide section in the releasing position passes the stopper sections and moves to the retaining position. The electronic card can be released from the movable retaining member by pushing the elastic arm sidewardly for the guide section to pass the stopper sections and move from the retaining position to the releasing position. With these arrangements, the electronic card retaining device has simple structure and can be easily handled without the need of using any tool.

Another object of the present invention is to provide the above electronic card retaining device, of which the guide section is provided at two sides located sequentially in a moving direction thereof with a beveled surface facing toward the retaining position and a curved surface facing toward the releasing position. With the beveled surface, the guide section can more easily pass the stopper sections while pushing and deforming the elastic arm gradually, and move from the releasing position to the retaining position. With the curved surface, the guide section can more easily pass the stopper sections while the elastic arm is deformed and bent by the sideward external force, and move from the retaining position to the releasing position smoothly, giving the electronic card retaining device an overall upgraded operation quality.

The structure and the technical means adopted by the present invention to achieve the above and other objects can be best understood by referring to the following detailed description of the preferred embodiments and the accompanying drawings, wherein:

DETAILED DESCRIPTION OF THE PREFERRED EMBODIMENTS

Figure 1:
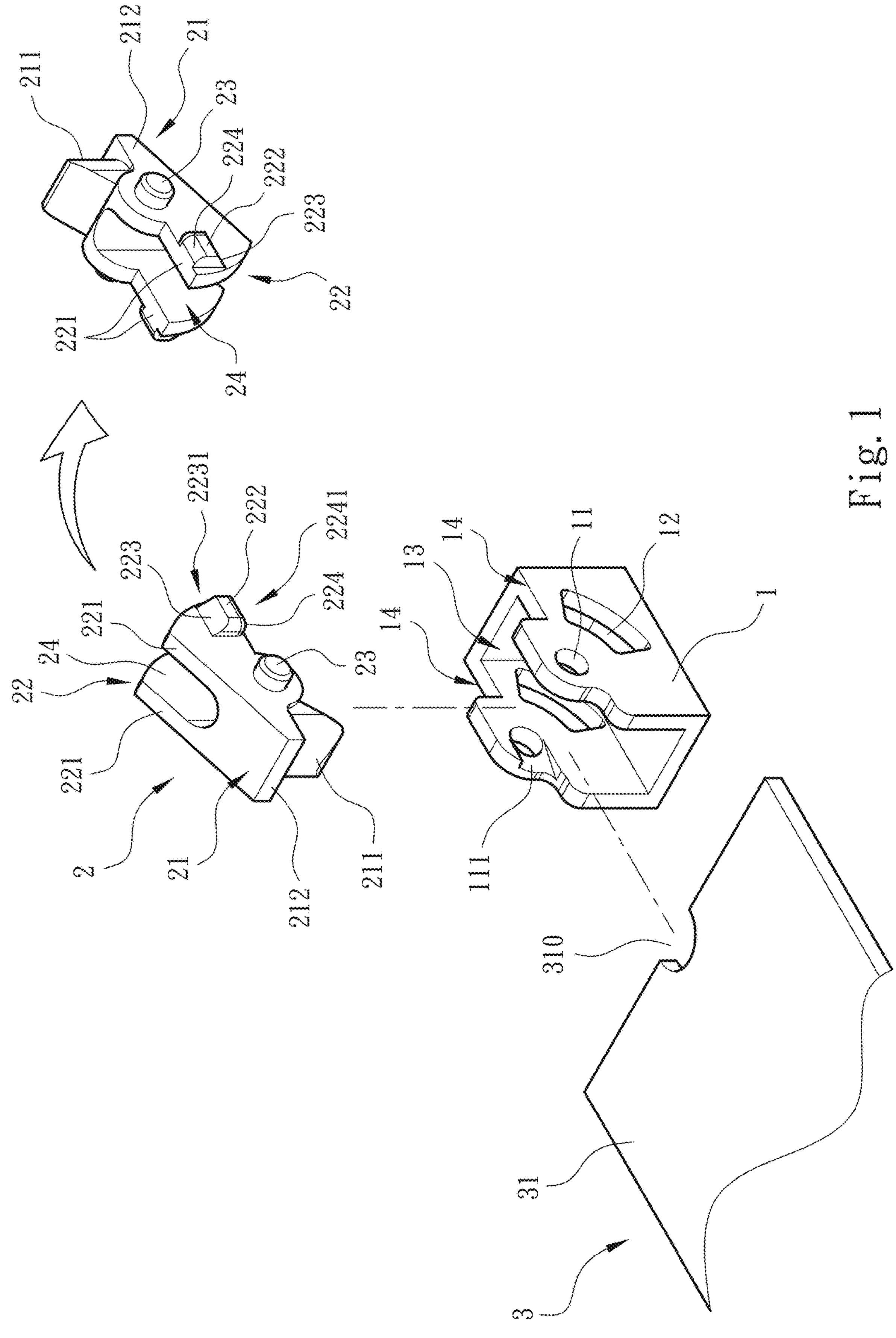
FIG. 1 is an exploded perspective view of an electronic card retaining device according to a preferred embodiment of the present invention.
Figure 2:
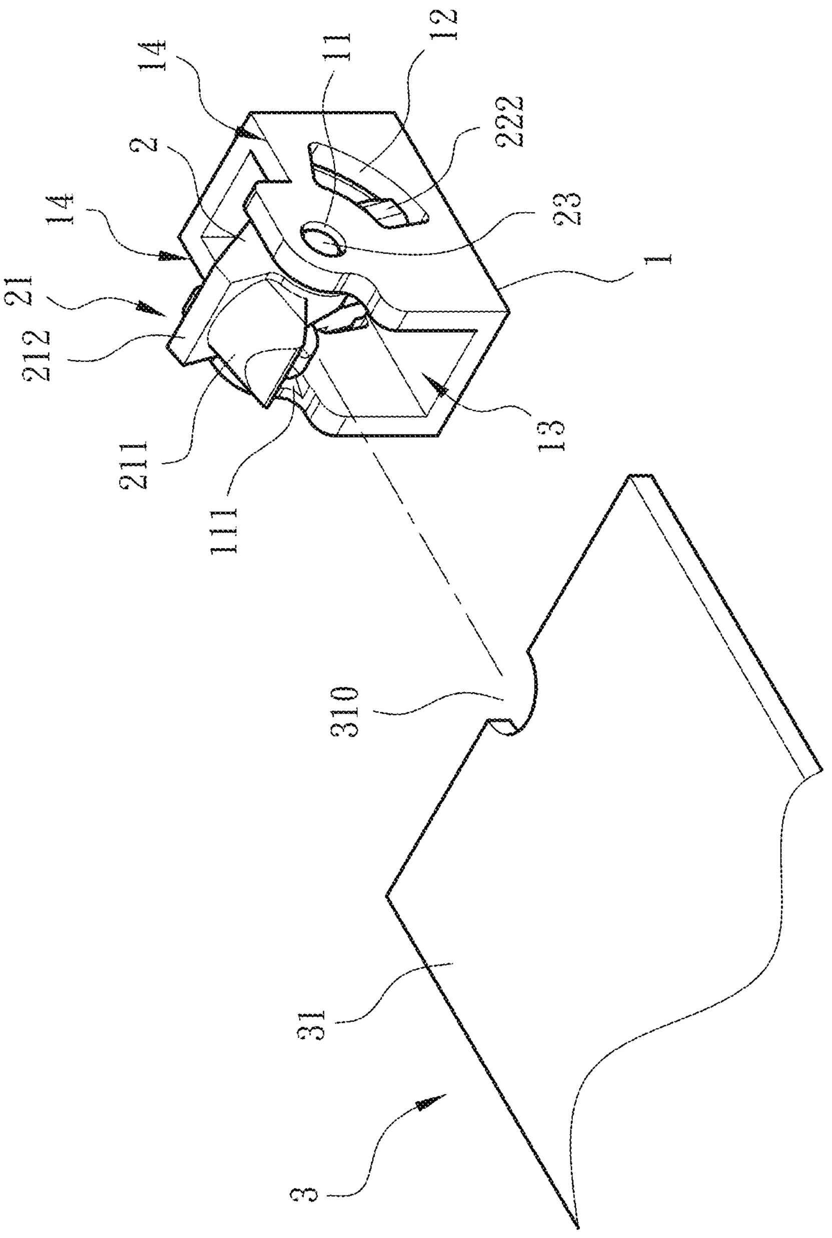
FIG. 2 is an assembled perspective view of the electronic card retaining device of the present invention as shown in FIG. 1.
Figure 3:
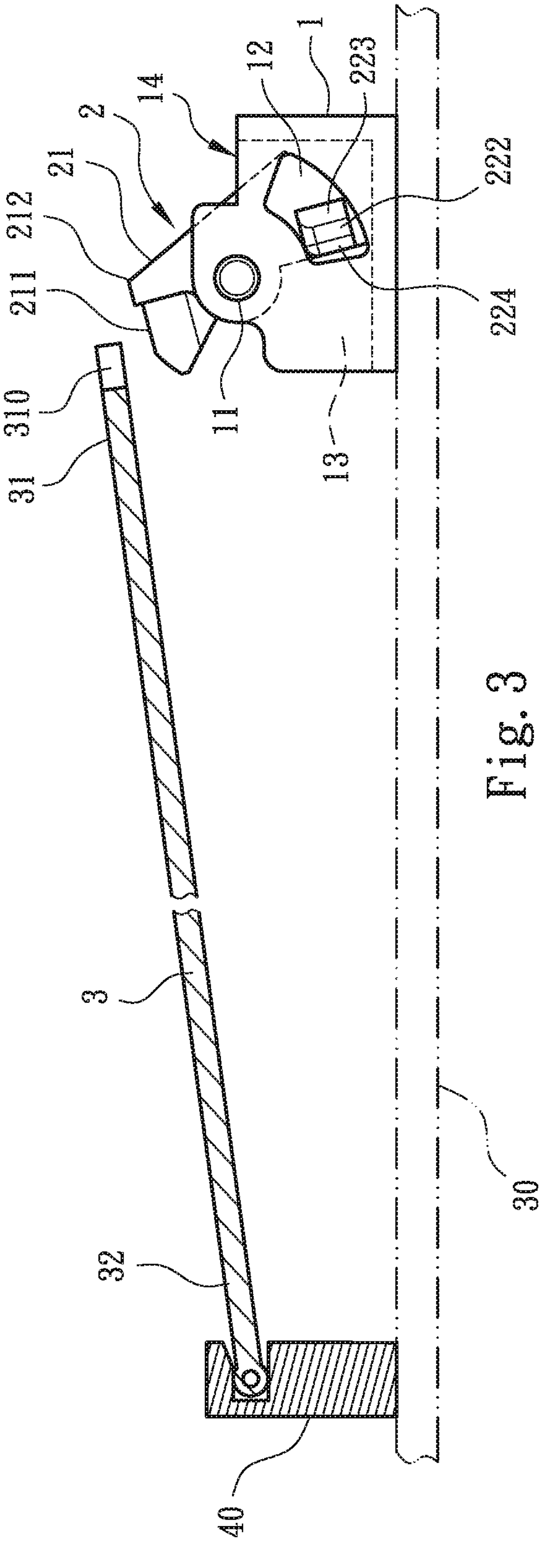
FIG. 3 is a first sectional side view showing the electronic card retaining device of the present invention before an electronic card is held in place by a movable retaining member thereof.

Please refer to FIGS. 1 to 3. An electronic card retaining device according to a preferred embodiment of the present invention includes a seat 1 and a movable retaining member 2. The seat 1 can be glued, welded, or connected via other element to a motherboard 30 at a position to one side of an electronic card 3, which can be, for example, a solid state drive (SSD).

The seat 1 internally defines an open-topped recessed receiving space 13. The receiving space 13 is provided on two sidewalls with two corresponding pivot receiving sections (such as two shaft holes) 11; two open recesses 111 extending from the pivot receiving sections 11 toward a front opening of the receiving space 13; two arcuate limiting guide slots 12 located adjacent to the pivot receiving sections 11; and two stopper sections 14 formed on the sidewalls at two upper rear ends thereof.

The movable retaining member 2 is provided at a middle portion with a pivot section 23 in the form of two sidewardly projected shafts, which move through the two open recesses 111 to set in and engage with the two pivot receiving sections 11, such that the movable retaining member 2 is pivotally connected to the seat 1.

The movable retaining member 2 has axially spaced front and rear ends, namely, a retaining end 21 and an operating end 22, respectively. The operating end 22 has a rear end surface formed into a recess portion 24, two lateral sides of which form into two parallelly extended elastic arms 221. The elastic arms 221 are provided on their outer surfaces facing away from the recess portion 24 with a laterally protruded guide section 222 each. The guide sections 222 move along paths defined by the limiting guide slots 12, such that the guide sections 222 are engaged with and guided by the limiting guide slots 12 to slide reciprocatingly.

In the above structure, the guide sections 222 are stopped by the stopper sections 14 to stay at one of a retaining position (or a locked state) and a releasing position (or a free state); and two opposite sides of each guide section 222 located sequentially in a moving direction thereof are a retaining side 2231 and a releasing side 2241, respectively. The retaining side 2231 is provided with a beveled surface 223 according to actual need; and the releasing side 2241 is provided with a curved surface 224 according to actual need.

In an operable embodiment, the electronic card 3 has an engaging end 31 provided on an edge thereof with a locating notch 310, and the retaining end 21 of the movable retaining member 2 extends toward the electronic card 3. The retaining end 21 includes a locating protrusion 211 provided on an end surface thereof corresponding to the locating notch 310, and a pressing section 212 located above the locating protrusion 211 to project toward the electronic card 3. It is noted a torque applied by the operating end 22 of the movable retaining member 2 on the pivot sections 23 is larger than that applied by the retaining end 21 on the pivot section 23, such that the movable retaining member 2 in a natural state without being subjected to any force can maintain at the releasing position and the retaining end 21 is in a tipped upward position, as shown in FIG. 2.

Figure 4:
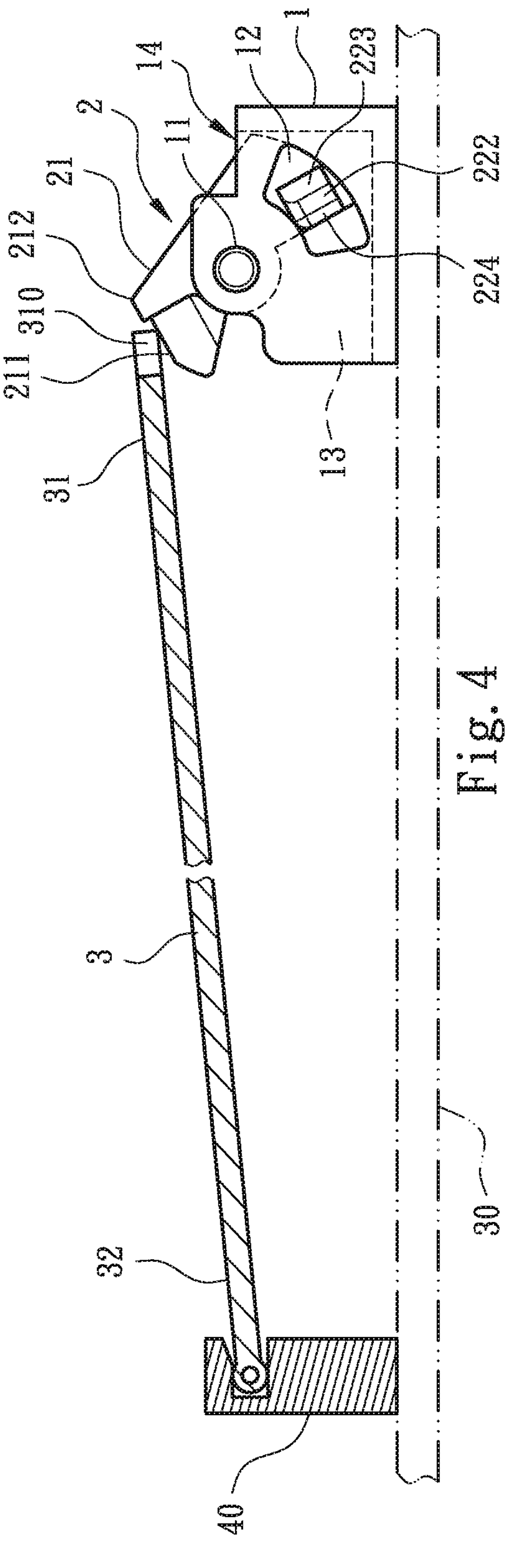
FIG. 4 is a second sectional side view showing the electronic card retaining device of the present invention, wherein the electronic card pushes against the movable retaining member when being installed.

In practical use of the electronic card retaining device of the present invention, first install the electronic card 3 by plugging an electrical connecting end 32 thereof in a terminal block 40 on the motherboard 30. At this point, the engaging end 31 of the electronic card 3 having the locating notch 310 is in an elastically tipped upward state and the movable retaining member 2 is in a releasing position, as shown in FIG. 3. Then, slowly press the engaging end 31 of the electronic card 3 against the locating protrusion 211 for the latter to slide downward. At this point, the movable retaining member 2 pivotally rotates about the pivot section 23 while bringing the operating end 22 (i.e. the guide sections 222) to move along the limiting guide slots 12 toward the stopper sections 14, as shown in FIG. 4.

Figure 5:
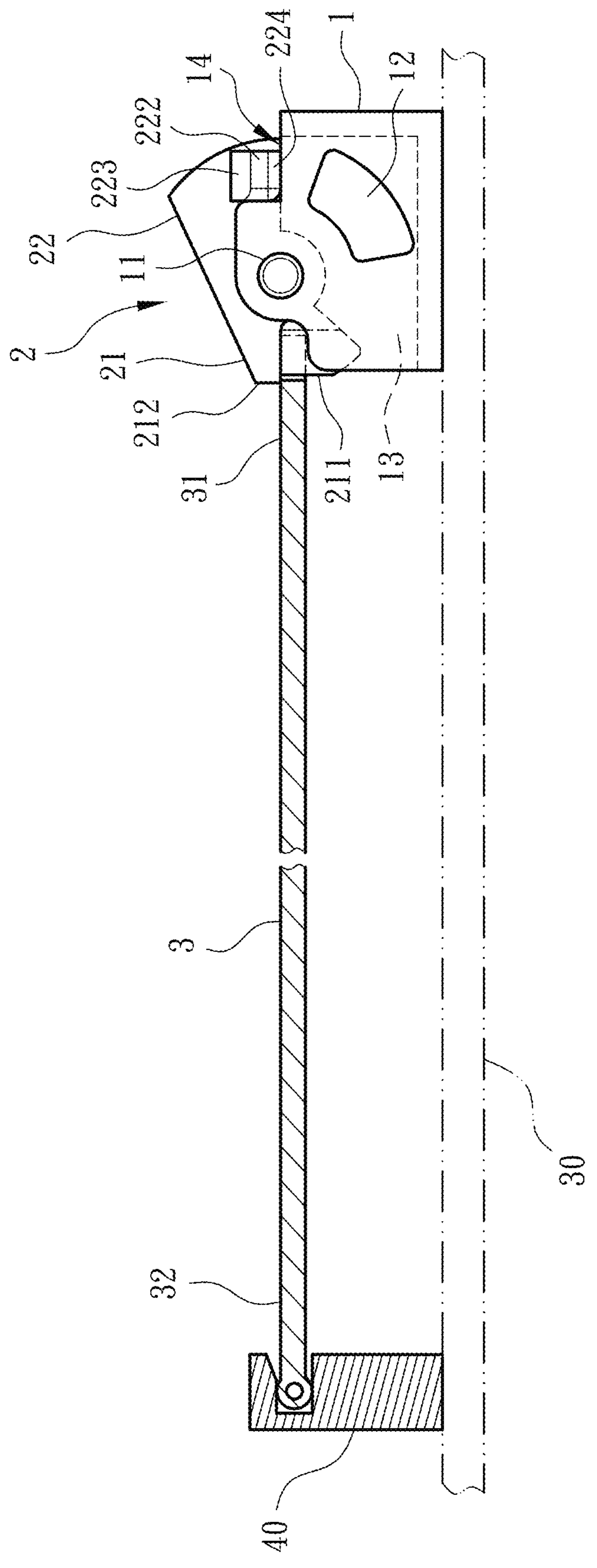
FIG. 5 is a third sectional side view of the electronic card retaining device of the present invention showing the movable retaining member thereof is in a retaining position to hold the electronic card in place.

In the process of slowly pressing the electronic card 3 against the locating protrusion 211, when the retaining sides 2231 of the guide sections 222 of the movable retaining member 2 are in contact with the stopper sections 14 (i.e. inner sidewall surfaces of the seat 1), the beveled surfaces 223 would cause the two elastic arms 221 to elastically deform and bend toward the recess portion 24, such that the guide sections 222 can pass the stopper sections 14 gradually. When the electronic card 3 is kept pressing against the movable retaining member 2 until the locating protrusion 211 is engaged with the locating notch 310 and the pressing section 212 is abutted on a top of the edge of the electronic card 3 having the locating notch 310, the electronic card 3 is stably held (locked) in place. Meanwhile, the locating protrusion 211 is engaged with the locating notch 310 to prevent the electronic card 3 from moving sidewardly, lest any undesired sideward bias of the electronic card 3 should cause trouble to the electrical connecting end 32. At this point, the guide sections 222 are moved through the stopper sections 14 to displace from the releasing position to the retaining position and are stopped by the stopper sections 14 from returning to the releasing position easily, as shown in FIG. 5, so that the electronic card 3 is maintained at a retained state.

Figure 6:
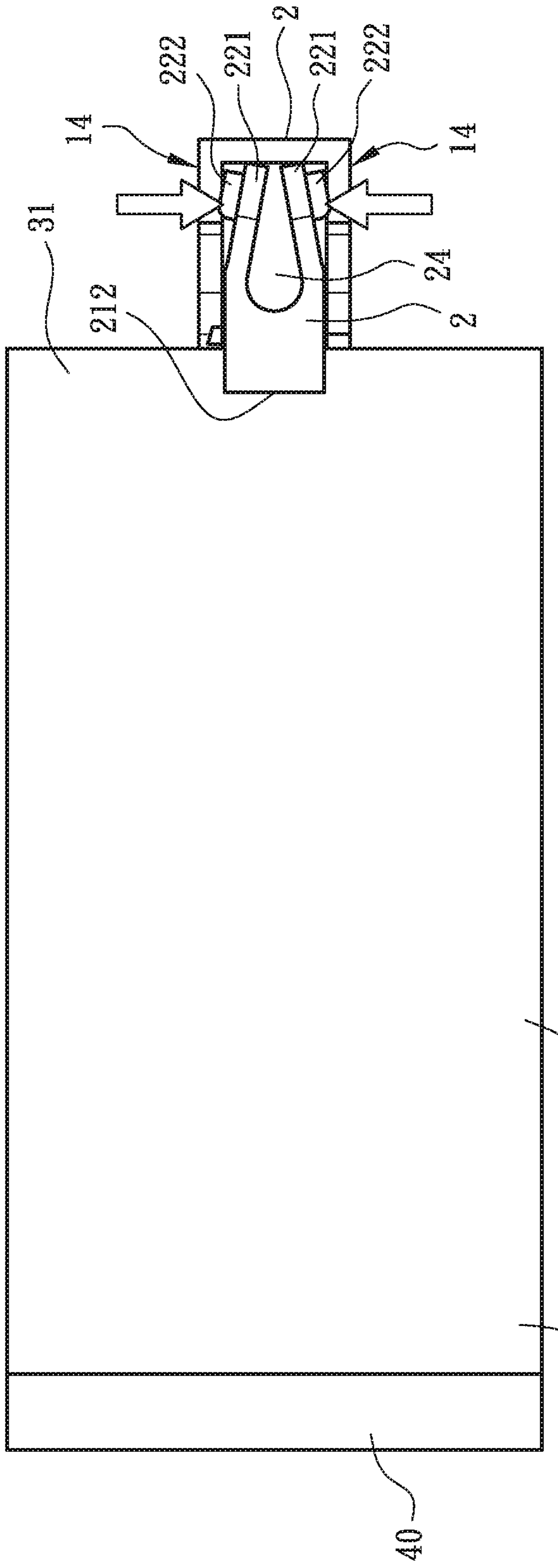
FIG. 6 is a top view showing how the electronic card retaining device of the present invention is operated to release the electronic card from the movable retaining member.
Figure 7:
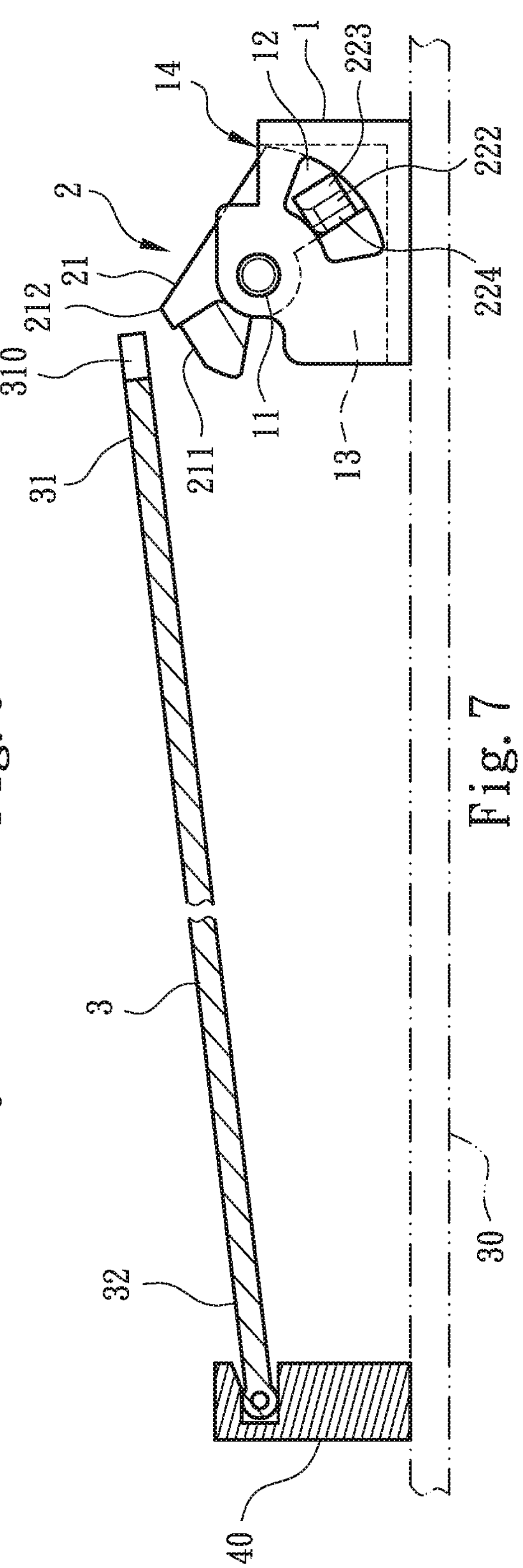
FIG. 7 is a fourth sectional side view of the electronic card retaining device of the present invention showing the movable retaining member thereof returns to a releasing position when the electronic card is released therefrom.

When it is desired to dismount the electronic card 3 from the motherboard 30, simply apply an external force to the elastic arms 221 of the movable retaining member 2 for the elastic arms 221 to elastically deform and bend toward the recess portion 24, as shown in FIG. 6. With the electrical connecting end 32 plugged in the terminal block 40, the engaging end 31 of the electronic card 3 is and keeps in an elastically tipped upward state when the movable retaining member 2 is in a natural state. Due to the curved surfaces 224 of the releasing sides 2241, the guide sections 222 can be successfully guided by the releasing sides 2241 to slide through the stopper sections 14, allowing the operating end 22 to return from the retaining position to the releasing position. At this point, the locating protrusion 211 and the pressing section 212 are moved away from the locating notch 310 of the electronic card 3, and an elastic force restored at the electrical connecting end 32 connected to the terminal block 40 enables the engaging end 31 of the electronic card 3 having the locating notch 310 to tip upward elastically to a position that allows a user to easily dismount the electronic card 3 from the motherboard 30, as shown in FIG. 7.

It is noted, in the event the seat 1 of the electronic card 3 has only one stopper section 14 and one limiting guiding slot 12 provided thereon, and the movable retaining member 2 of the electronic card retaining device has only one elastic arm 221 and one guide section 222 provided thereon, the present invention in practical application can still be operated in a similar way to achieve the same effect as the illustrated preferred embodiment.

The present invention with the above described structure has the following characteristics:

(1) Compared to the prior art structures, no elastic element (i.e. spring) is needed between the seat 1 and the movable retaining member 2 of the present invention, which advantageously enables reduced parts cost and reduced difficulty in assembling the electronic card retaining device.

(2) The movable retaining member 2 of the present invention is properly designed to have good gravitational torque distribution, so that the retaining end 21 of the movable retaining member 2 can maintain at the tipped upward releasing position when the movable retaining member 2 is in a natural state without being subjected to any force. No other structure is needed in the structural design of the present invention for raising the retaining end 21, which largely simplifies an overall structure of the electronic card retaining device.

(3) With the present invention, the electronic card 3 can be dismounted simply by pushing the elastic arms 221 to bend them with one hand before subsequent dismounting step without using any tool. Therefore, the present invention is convenient for use.

In conclusion, the electronic card retaining device according to the present invention indeed has the advantages of simplified structure, easy to assemble, and convenient to operate to meet the requirements of novelty and improvement for granting a patent. It is also understood the present invention has been described with a preferred embodiment thereof and many changes and modifications in the described embodiment can be carried out without departing from the scope and the spirit of the invention that is intended to be limited only by the appended claims.

What is claimed is:

1. An electronic card retaining device, comprising:

a seat (1) having at least one stopper section (14) provided thereon; and a movable retaining member (2) being pivotally connected at a middle portion to the seat (1) and having axially spaced front and rear ends, which are a retaining end (21) and an operating end (22), respectively; the retaining end (21) being extended toward a position to where an electronic card (3) is to be fixed, and the operating end (22) having at least one elastic arm (221), on which a guide section (222) is provided; the guide section (222) being so configured that it is able to contact with the at least one stopper section (14) and cause the at least one elastic arm (221) to deform when the movable retaining member (2) is turned pivotally on and relative to the seat (1), such that the guide section (222) is allowed to pass by the at least one stopper section (14) and switch between a releasing position and a retaining position; and the retaining end (21) being engaged with the electronic card (3) to retain the electronic card (3) in place when the guide section (222) is located at the retaining position, and the retaining end (21) being disengaged from the electronic card (3) when the guide section (222) is located at the releasing position;

wherein the seat (1) internally defines a recessed receiving space (13); the receiving space (13) being provided between two sidewalls, at least one of two sidewalls having a curved limiting guide slot (12) corresponding to a moving path of the guide section (222); and the at least one stopper section (14) being located to one end of the limiting guide slot (12) closer to an open top of the seat (1).

2. The electronic card retaining device as claimed in claim 1, wherein the operating end (22) has a rear end surface formed into a recess portion (24), and at least one of two lateral sides of the recess portion (24) being formed into the at least one elastic arm (221); and the guide section (222) being separately provided on a side surface of the at least one elastic arm facing away from the recess portion (24).

3. The electronic card retaining device as claimed in claim 2, wherein the receiving space (13) is provided on two sidewalls with two corresponding pivot receiving sections (11), and the movable retaining member (2) being provided at the middle portion on two sidewalls with two pivot sections (23) for pivotally engaging with the pivot receiving sections (11); the movable retaining member (2) having a torque applied by the operating end (22) on the pivot sections (23) larger than a torque applied by the retaining end (21) on the pivot sections (23), such that the retaining end (21) maintains at the releasing position in a tipped upward state when the movable retaining member (2) is in a natural state without being subjected to any applied force.

4. The electronic card retaining device as claimed in claim 2, wherein the guide section (222) is provided at two opposite sides, which are located sequentially in a moving direction thereof, with a beveled surface (223) and a curved surface (224); the beveled surface being pressed against the at least one stopper section (14) when the guide section (222) is moved from the releasing position to the retaining position, such that the at least one elastic arm (221) is pushed by the guide section (222) to deform and bend gradually, allowing the guide section (222) to pass the at least one stopper section (14) to the retaining position; and wherein the guide section (222) is movable from the retaining position to pass the at least one stopper section (14) and return to the releasing position when an external force is applied sidewardly to deform and bend the at least one elastic arm (221) and allow the curved surface (224) of the guide section (222) to slide by the at least one stopper section (14) with the aid of a tip-up elastic force of the electronic card (3).

5. The electronic card retaining device as claimed in claim 4, wherein the seat (1) is mounted on a motherboard (30); the electronic card (3) having an engaging end (31) provided on an edge thereof with a locating notch (310), and an opposite electrical connecting end (32) electrically connected to a terminal block (40) provided on the motherboard (30); and the retaining end (21) of the movable retaining member (2) including a locating protrusion (211) for engaging with the locating notch (310) on the electronic card (3), and a pressing section (212) located above the locating protrusion (211) for abutting on areas surrounding the locating notch (310).

6. The electronic card retaining device as claimed in claim 2, wherein the seat (1) is mounted on a motherboard (30); the electronic card (3) having an engaging end (31) provided on an edge thereof with a locating notch (310), and an opposite electrical connecting end (32) electrically connected to a terminal block (40) provided on the motherboard (30); and the retaining end (21) of the movable retaining member (2) including a locating protrusion (211) for engaging with the locating notch (310) on the electronic card (3), and a pressing section (212) located above the locating protrusion (211) for abutting on areas surrounding the locating notch (310).

7. The electronic card retaining device as claimed in claim 1, wherein the receiving space (13) is provided on two sidewalls with two corresponding pivot receiving sections (11), and the movable retaining member (2) being provided at the middle portion on two sidewalls with two pivot sections (23) for pivotally engaging with the pivot receiving sections (11); the movable retaining member (2) having a torque applied by the operating end (22) on the pivot sections (23) larger than a torque applied by the retaining end (21) on the pivot sections (23), such that the retaining end (21) maintains at the releasing position in a tipped upward state when the movable retaining member (2) is in a natural state without being subjected to any applied force.

8. The electronic card retaining device as claimed in claim 7, wherein the pivot receiving sections (11) are shaft holes, and the pivot sections (23) being two sidewardly projected shafts for extending into and engaging with the pivot receiving sections (11); and the receiving space (13) being provided on inner sides of the two sidewalls with two open recesses (111), and the open recesses (111) being extended from the pivot receiving sections (11) toward a front opening of the receiving space (13).

9. The electronic card retaining device as claimed in claim 7, wherein the guide section (222) is provided at two opposite sides, which are located sequentially in a moving direction thereof, with a beveled surface (223) and a curved surface (224); the beveled surface being pressed against the at least one stopper section (14) when the guide section (222) is moved from the releasing position to the retaining position, such that the at least one elastic arm (221) is pushed by the guide section (222) to deform and bend gradually, allowing the guide section (222) to pass the at least one stopper section (14) to the retaining position; and wherein the guide section (222) is movable from the retaining position to pass the at least one stopper section (14) and return to the releasing position when an external force is applied sidewardly to deform and bend the at least one elastic arm (221) and allow the curved surface (224) of the guide section (222) to slide by the at least one stopper section (14) with the aid of a tip-up elastic force of the electronic card (3).

10. The electronic card retaining device as claimed in claim 7, wherein the seat (1) is mounted on a motherboard (30); the electronic card (3) having an engaging end (31) provided on an edge thereof with a locating notch (310), and an opposite electrical connecting end (32) electrically connected to a terminal block (40) provided on the motherboard (30); and the retaining end (21) of the movable retaining member (2) including a locating protrusion (211) for engaging with the locating notch (310) on the electronic card (3), and a pressing section (212) located above the locating protrusion (211) for abutting on areas surrounding the locating notch (310).

11. The electronic card retaining device as claimed in claim 1, wherein the guide section (222) is provided at two opposite sides, which are located sequentially in a moving direction thereof, with a beveled surface (223) and a curved surface (224); the beveled surface being pressed against the at least one stopper section (14) when the guide section (222) is moved from the releasing position to the retaining position, such that the at least one elastic arm (221) is pushed by the guide section (222) to deform and bend gradually, allowing the guide section (222) to pass the at least one stopper section (14) to the retaining position; and wherein the guide section (222) is movable from the retaining position to pass the at least one stopper section (14) and return to the releasing position when an external force is applied sidewardly to deform and bend the at least one elastic arm (221) and allow the curved surface (224) of the guide section (222) to slide by the at least one stopper section (14) with the aid of a tip-up elastic force of the electronic card (3).

12. The electronic card retaining device as claimed in claim 11, wherein the seat (1) is mounted on a motherboard (30); the electronic card (3) having an engaging end (31) provided on an edge thereof with a locating notch (310), and an opposite electrical connecting end (32) electrically connected to a terminal block (40) provided on the motherboard (30); and the retaining end (21) of the movable retaining member (2) including a locating protrusion (211) for engaging with the locating notch (310) on the electronic card (3), and a pressing section (212) located above the locating protrusion (211) for abutting on areas surrounding the locating notch (310).

13. The electronic card retaining device as claimed in claim 1, wherein the seat (1) is mounted on a motherboard (30); the electronic card (3) having an engaging end (31) provided on an edge thereof with a locating notch (310), and an opposite electrical connecting end (32) electrically connected to a terminal block (40) provided on the motherboard (30); and the retaining end (21) of the movable retaining member (2) including a locating protrusion (211) for engaging with the locating notch (310) on the electronic card (3), and a pressing section (212) located above the locating protrusion (211) for abutting on areas surrounding the locating notch (310).

14. The electronic card retaining device as claimed in claim 1, wherein the seat (1) includes two stopper sections (14) provided thereon; the operating end (22) includes two elastic arms (221), on which a guide section (222) is provided on each of the elastic arms (221), each guide section (222) is configured to contact a corresponding stopper section (14) of the two stopper sections (14) and cause each of the two elastic arms (221) to deform when the movable retaining member (2) is turned pivotally on and relative to the seat (1), such that each guide section (222) is allowed to pass by the corresponding stopper section (14) of the two stopper sections (14) and switch between a releasing position and a retaining position.

15. The electronic card retaining device as claimed in claim 14, wherein the operating end (22) has a rear end surface formed into a recess portion (24), and two lateral sides of the recess portion (24) being formed into the elastic arms (221) and extending parallel to each other; and each guide section (222) being separately provided on opposite side surfaces of the elastic arms facing away from the recess portion (24).

16. The electronic card retaining device as claimed in claim 15, wherein each guide section (222) is provided at two opposite sides, which are located sequentially in a moving direction thereof, with a beveled surface (223) and a curved surface (224); the beveled surface being pressed against the corresponding stopper section (14) of the two stopper sections (14) when each guide section (222) is moved from the releasing position to the retaining position, such that the elastic arms (221) are pushed by each guide section (222) to deform and bend gradually, allowing each guide section (222) to pass the corresponding stopper section of the stopper sections (14) to the retaining position; and wherein each guide section (222) is movable from the retaining position to pass the corresponding stopper section of the stopper sections (14) and return to the releasing position when an external force is applied sidewardly to deform and bend the elastic arms (221) and allow the curved surface (224) of each guide section (222) to slide by the corresponding stopper section of the stopper sections (14) with the aid of a tip-up elastic force of the electronic card (3).

17. The electronic card retaining device as claimed in claim 14, wherein each guide section (222) is provided at two opposite sides, which are located sequentially in a moving direction thereof, with a beveled surface (223) and a curved surface (224); the beveled surface being pressed against the corresponding stopper section (14) of the two stopper sections (14) when each guide section (222) is moved from the releasing position to the retaining position, such that the elastic arms (221) are pushed by each guide section (222) to deform and bend gradually, allowing each guide section (222) to pass the corresponding stopper section of the stopper sections (14) to the retaining position; and wherein each guide section (222) is movable from the retaining position to pass the corresponding stopper section of the stopper sections (14) and return to the releasing position when an external force is applied sidewardly to deform and bend the elastic arms (221) and allow the curved surface (224) of each guide section (222) to slide by the corresponding stopper section of the stopper sections (14) with the aid of a tip-up elastic force of the electronic card (3).

18. An electronic card retaining device, comprising:

a seat (1) having at least one stopper section (14) provided thereon; and a movable retaining member (2) being pivotally connected at a middle portion to the seat (1) and having axially spaced front and rear ends, which are a retaining end (21) and an operating end (22), respectively; the retaining end (21) being extended toward a position to where an electronic card (3) is to be fixed, and the operating end (22) having at least one elastic arm (221), on which a guide section (222) is provided; the guide section (222) being so configured that it is able to contact with the at least one stopper section (14) and cause the at least one elastic arm (221) to deform when the movable retaining member (2) is turned pivotally on and relative to the seat (1), such that the guide section (222) is allowed to pass by the at least one stopper section (14) and switch between a releasing position and a retaining position; and the retaining end (21) being engaged with the electronic card (3) to retain the electronic card (3) in place when the guide section (222) is located at the retaining position, and the retaining end (21) being disengaged from the electronic card (3) when the guide section (222) is located at the releasing position;

wherein the guide section (222) is provided at two opposite sides, which are located sequentially in a moving direction thereof, with a beveled surface (223) and a curved surface (224); the beveled surface being pressed against the at least one stopper section (14) when the guide section (222) is moved from the releasing position to the retaining position, such that the at least one elastic arm (221) is pushed by the guide section (222) to deform and bend gradually, allowing the guide section (222) to pass the at least one stopper section (14) to the retaining position; and wherein the guide section (222) is movable from the retaining position to pass the at least one stopper section (14) and return to the releasing position when an external force is applied sidewardly to deform and bend the at least one elastic arm (221) and allow the curved surface (224) of the guide section (222) to slide by the at least one stopper section (14) with the aid of a tip-up elastic force of the electronic card (3).

19. An electronic card retaining device, comprising:

a seat (1) having at least one stopper section (14) provided thereon; and a movable retaining member (2) being pivotally connected at a middle portion to the seat (1) and having axially spaced front and rear ends, which are a retaining end (21) and an operating end (22), respectively; the retaining end (21) being extended toward a position to where an electronic card (3) is to be fixed, and the operating end (22) having at least one elastic arm (221), on which a guide section (222) is provided; the guide section (222) being so configured that it is able to contact with the at least one stopper section (14) and cause the at least one elastic arm (221) to deform when the movable retaining member (2) is turned pivotally on and relative to the seat (1), such that the guide section (222) is allowed to pass by the at least one stopper section (14) and switch between a releasing position and a retaining position; and the retaining end (21) being engaged with the electronic card (3) to retain the electronic card (3) in place when the guide section (222) is located at the retaining position, and the retaining end (21) being disengaged from the electronic card (3) when the guide section (222) is located at the releasing position;

wherein the seat (1) is mounted on a motherboard (30); the electronic card (3) having an engaging end (31) provided on an edge thereof with a locating notch (310), and an opposite electrical connecting end (32) electrically connected to a terminal block (40) provided on the motherboard (30); and the retaining end (21) of the movable retaining member (2) including a locating protrusion (211) for engaging with the locating notch (310) on the electronic card (3), and a pressing section (212) located above the locating protrusion (211) for abutting on areas surrounding the locating notch (310).

* * * * *